US008418839B2

(12) United States Patent
Anderson

(10) Patent No.: US 8,418,839 B2
(45) Date of Patent: Apr. 16, 2013

(54) POWERED ROLLER CONVEYOR SYSTEMS

(75) Inventor: Richard Floyd Anderson, Massillon, OH (US)

(73) Assignee: KPC Master's Craft International, Inc., Massillon, OH (US)

( * ) Notice: Subject to any disclaimer, the term of this patent is extended or adjusted under 35 U.S.C. 154(b) by 108 days.

(21) Appl. No.: 12/872,126

(22) Filed: Aug. 31, 2010

(65) Prior Publication Data

US 2011/0089002 A1 Apr. 21, 2011

Related U.S. Application Data

(60) Provisional application No. 61/238,671, filed on Aug. 31, 2009.

(51) Int. Cl.
*B65G 13/07* (2006.01)
(52) U.S. Cl.
USPC ............................................ 198/790; 198/787
(58) Field of Classification Search ......... 198/781.02–781.04, 781.08–781.1
See application file for complete search history.

(56) References Cited

U.S. PATENT DOCUMENTS

| 4,473,149 | A | * | 9/1984 | Vogt et al. | 198/781.04 |
| 5,038,923 | A | * | 8/1991 | Evans | 198/781.02 |
| 5,082,109 | A | * | 1/1992 | Blondeau | 198/781.03 |
| 5,540,323 | A | * | 7/1996 | Schiesser et al. | 198/781.06 |
| 5,582,287 | A | * | 12/1996 | Heit et al. | 198/867.01 |
| 6,422,378 | B1 | * | 7/2002 | Allgaier | 198/781.03 |
| 6,585,107 | B1 | * | 7/2003 | Specht | 198/790 |
| 6,612,423 | B1 | * | 9/2003 | Silverman | 198/790 |
| 6,814,222 | B2 | * | 11/2004 | Henson et al. | 198/781.06 |
| 2002/0108839 | A1 | * | 8/2002 | Baker et al. | 198/781.03 |

FOREIGN PATENT DOCUMENTS

JP 63272705 A * 11/1988 ............... 198/781.09

* cited by examiner

*Primary Examiner* — Mark A Deuble
(74) *Attorney, Agent, or Firm* — Tillman Wright, PLLC; Chad D. Tillman; Jeremy C. Doerre

(57) ABSTRACT

A power roller conveyor system includes a section having a slide mechanism that engages a loop that is driven by an external motor. The loop slides along a surface of the slide mechanism. The slide mechanism maintains the loop in frictional engagement with surfaces of rollers of the conveyor, whereby the rollers are directly driven by the loop. A wheel may bridge a directly driven roller and another roller that is not driven. The other roller and driven roller bridged by the wheel may be separated by an intermediate roller. The section may be a straight section, a 90 degree curved section, or a 180 degree curved section.

19 Claims, 9 Drawing Sheets

POWERED ROLLER CONVEYOR SYSTEMS

CROSS-REFERENCE TO RELATED APPLICATION

The present application is a U.S. nonprovisional patent application of, and claims priority under 35 U.S.C. §119(e) to, U.S. provisional patent application Ser. No. 61/238,671, filed Aug. 31, 2009, which provisional patent application is hereby incorporated herein by reference.

This application hereby incorporates herein by reference US Patent Application Publication No. 2011/0089002, which will sometimes hereinafter be referred to as "the '002 publication".

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention relates to powered roller conveyor systems and, in particular, straight sections, 90 degree sections, and 180 degree sections thereof.

A. Powered Roller Conveyor Systems: Straight Sections

A conventional straight section of a powered roller conveyor system is shown in drawing 1 of the '002 publication and includes pulleys and a belt. A partially disassembled conventional straight section of a powered roller conveyor system is shown in drawing 2 of the '002 publication, and is similar in structure and operation to that shown in drawing 1 of the '002 publication. Another partially disassembled conventional straight section of the powered roller conveyor system of drawing 2 of the '002 publication is shown in drawing 3 of the '002 publication, and a pulley and associated components of that powered roller conveyor system are shown in drawing 4 of the '002 publication.

One conventional method of powering a roller is to use an internal motor. A good example of an internally powered roller is the motorized roller shown in drawing 5 of the '002 publication, which is manufactured by Itoh Denki of Hanover Township, Pa. under model number PM486FS. The internally powered roller shown in drawing 5 of the '002 publication includes two groves, each one designed to receive a loop of some kind, ranging from a rubber band to an O-ring, chain, belt, tube, strand, cord or cable (hereinafter referred to generally as a "loop"). The loop extends to an adjacent roller for indirectly driving the adjacent roller. A powered roller conveyor system is shown in drawing 6 of the '002 publication, in which rollers are internally powered and include loops and grooves for driving other rollers.

While less expensive than an internally powered roller, the non-powered rollers are more expensive than regular rollers due to the groves and the loops, which creates the need for a lot of parts and creates subsequent maintenance issues.

Another method is to drive one or more of the roller with an exterior motor. The motor pulls a loop that is engaged with and directly drives one or more of the rollers, and some of the rollers are not driven by such loop and, instead, are driven by secondary loops that extend between such rollers and the directly driven rollers. For example, an external motor may drive a single roller via a chain, and additional chains and sprockets may be used for other rollers to be driven by such single roller. An exemplary chain-driven powered roller conveyor is shown in drawings 7-8 of the '002 publication. Each roller includes two sprockets and is connected by respective chains to adjacent rollers.

Another way of powering a conveyor includes using an external motor that rotates a drive shaft that runs the length of the conveyor. A respective loop extends from the shaft to each roller, and the loop twists in a figure eight whereby the shaft and the rollers rotate perpendicular to one another. Drawings 9-11 of the '002 publication illustrate such a powered roller conveyor system.

Yet another conventional way to drive a powered roller conveyor is to use a loop that extends under and frictionally engages the surfaces of the driven rollers. A belt may be used that is flat or may include a "V" or "U" cross-sectional profile. An exemplary powered roller conveyor that utilizes a loop in the form of a wide and flat belt to frictionally engage and drive rollers is shown in drawings 12-14 of the 002 publication.

B. Powered Roller Conveyor Systems: 90 Degree Curved Sections

Curved power roller conveyors are more complicated to design and build, especially with the conventional use of pulleys, compared to straight section powered roller conveyors.

A 90 degree curved section of a conventional powered roller conveyor system is shown partially disassembled in drawing 15 of the '002 publication. Drawings 16-17 of the '002 publication also illustrate partially disassembled views of another, similar 90 degree curved section of a conventional powered roller conveyor system.

In use, it is difficult to keep the loop on and tracking correctly, and the pulley system creates drag which causes the loop (if extensible) to stretch and eventually fall off.

Additionally, it will be appreciated that in conventional 90 degree curved sections of powered roller conveyor systems, the last roller in a curved section is indirectly driven by tying the last roller with a prior driven roller, again using a loop of some kind. Normally the rollers that are looped together have a special crimp into which the loop of material is placed, which enables the loop to track correctly and stay in place.

C. Powered Roller Conveyor Systems: 180 Degree Curved Sections

A 180 degree curved section of a conventional powered roller conveyor system is shown partially disassembled in drawing 18 of the '002 publication.

As will be appreciated, the drive mechanisms of these foregoing conventional ways tend to follow the curve, which is believed to be a significant contributor to the expense thereof, as following the curve requires more parts in tracking the curve and more labor in assembly.

Various ways exist to power 180 degree and 90 degree curved sections of powered roller conveyors. One way is to power all of the pulleys. Another way is to use a tapered roller, which can be the internal motor type or driven by a loop (e.g., belt, chain, etc.). This is generally expensive. A third way is to use a series of drive shafts that are coupled together with "U" joints. Normally the shaft drives the rollers by the twisted, figure "8" loops. Curved sections of conventional powered roller conveyor systems that utilize U joints are represented in drawing 19 of the '002 publication.

Due to space constraints, extra cost or other reasons, it is often common to directly drive only a subset of the rollers directly by the power source—rather than directly drive all of the rollers—in a powered roller conveyor. In such cases, the other rollers are driven by indirect means.

Additionally, it will be appreciated that, like in with 90 degree curved sections, in many conventional 180 degree curved sections of powered roller conveyor systems, the last roller in a curved section is indirectly driven by tying the last roller with a prior driven roller using a loop. Normally the rollers that are looped together have a special crimp into which the loop of material is placed, which enables the loop to track correctly and stay in place.

As will be appreciated by those having ordinary skill in the art, the straight sections of powered roller conveyors are much easier to make and use compared to the 90 degree and 180 degree curved sections of powered roller conveyors. The curved sections have many additional parts, it is difficult to keep the loop on and tracking correctly in such conveyors, and the pulley system in the curved section of such conveyors creates drag which causes the loop to stretch (if extensible) and fall off.

SUMMARY OF THE INVENTION

The present invention includes many aspects and features. Moreover, while many aspects and features relate to, and are described in, the context of power roller conveyors, the present invention is not limited to use only in this context, as will become apparent from the following summaries and detailed descriptions of aspects, features, and one or more embodiments of the present invention.

Accordingly, one aspect of the present invention relates to a section of a power roller conveyor. The power roller conveyor includes a plurality of rollers, an endless loop driven either directly or indirectly by a motor and traveling along the section and in engagement with at least a subset of the plurality of rollers, and a slide mechanism defining a groove within which the endless loop slides while traveling in engagement with the subset of rollers.

In a feature of this aspect, the groove is defined in the top surface of the slide mechanism.

In a feature of this aspect, the loop is maintained in frictional engagement with surfaces of the rollers of the subset, whereby the rollers are directly driven by the loop.

In a feature of this aspect, a low coefficient of friction exists between the surface of the slide mechanism against which the loop slides and the loop.

In a feature of this aspect, each of the subset of rollers includes a sleeve extending over the surface thereof adjacent an end thereof, the sleeve engaging the loop for traction and driving of the roller.

In a feature of this aspect, a high coefficient of friction exists between the surface of the loop and the sleeve of the roller.

In a feature of this aspect, the slide mechanism includes a material that is self lubricating, whereby frictional stress exerted on the loop by the slide mechanism is greatly reduced.

In a feature of this aspect, the slide mechanism comprises a curved slide mechanism that generally tracks a curve in a side rail of the section of the powered conveyor system.

In a feature of this aspect, the slide mechanism comprises a straight slide mechanism that generally extends linearly along a length of the section of the powered conveyor system.

In a feature of this aspect, the slide mechanism is made from Ultra High Molecular Weight Polyethylene ("UHMW-PE").

In a feature of this aspect, the loop is composed of polyurethane or related polymers.

In a feature of this aspect, the loop comprises a belt formed from tanned leather.

In a feature of this aspect, sides of the slide mechanism that at least partially define the groove are scalloped, and wherein the subset of rollers extend within the recessed areas of the scalloped sides for contacting of the loop.

In a feature of this aspect, the sides of the slide mechanism exhibit a wavy profile, and wherein the subset of rollers extend within the troughs of the wavy sides to contact the loop.

In a feature of this aspect, the loop includes a flat, smooth surface that is exposed when traveling in engagement with the subset of rollers, and a non-exposed curved surface that slides against the slide mechanism in a conforming fit within the groove.

In a feature of this aspect, the section is a straight section.
In a feature of this aspect, the section is a 90 degree section.
In a feature of this aspect, the slide mechanism is curved.
In a feature of this aspect, the slide mechanism is generally linear.
In a feature of this aspect, the section is a 180 degree section.

In a feature of this aspect, the section of a power roller conveyor further comprises a wheel arranged to engage a roller of the subset of rollers driven by the loop and to engage a roller not in engagement with the loop, whereby the roller not in engagement with the loop is indirectly driven by the loop.

In a feature of this aspect, the roller not in engagement with the loop that is indirectly driven by the loop is an end roller of the section.

In a feature of this aspect, the section of a power roller conveyor further comprises a second wheel arranged to engage a roller of the subset of rollers driven by the loop and to engage a second roller not in engagement with the loop, whereby the second roller not in engagement with the loop is indirectly driven by the loop, and wherein the second roller not in engagement with the loop that is indirectly driven by the loop is another end roller of the section located at an opposite end of the section to the first said roller not in engagement with the loop that is indirectly driven by the loop.

In a feature of this aspect, each of the wheels is coated with a silicone material.

In a feature of this aspect, an intermediate, concentrated roller extends between the roller of the subset engaged with the wheel and the end roller driven by the wheel.

In a feature of this aspect, the concentrated roller is approximately half as long as each of the roller of the subset engaged with the wheel and the end roller driven by the wheel.

In a feature of this aspect, the concentrated roller is mounted to a side rail of the conveyor and is a member of the subset of rollers arranged in engagement with and driven by the loop.

In a feature of this aspect, the concentrated roller is mounted to a side rail of the conveyor and is a member of the subset of rollers arranged in engagement with and driven by the loop.

In a feature of this aspect, the concentrated roller is mounted to and supported by an intermediate support that extends generally longitudinally along the section approximately half way between the side rails of the section.

Another aspect of the present invention relates to a section of a power roller conveyor system as disclosed.

Another aspect of the present invention relates to a method of making a section of a power roller conveyor system as disclosed herein.

Another aspect of the present invention relates to a method of using a section of a power roller conveyor system as disclosed herein.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein, FIG. 1 show a preferred powered roller conveyor system including a straight slide mechanism in accordance with one or more aspects that is partially disassembled.

DETAILED DESCRIPTION

Figure 1:
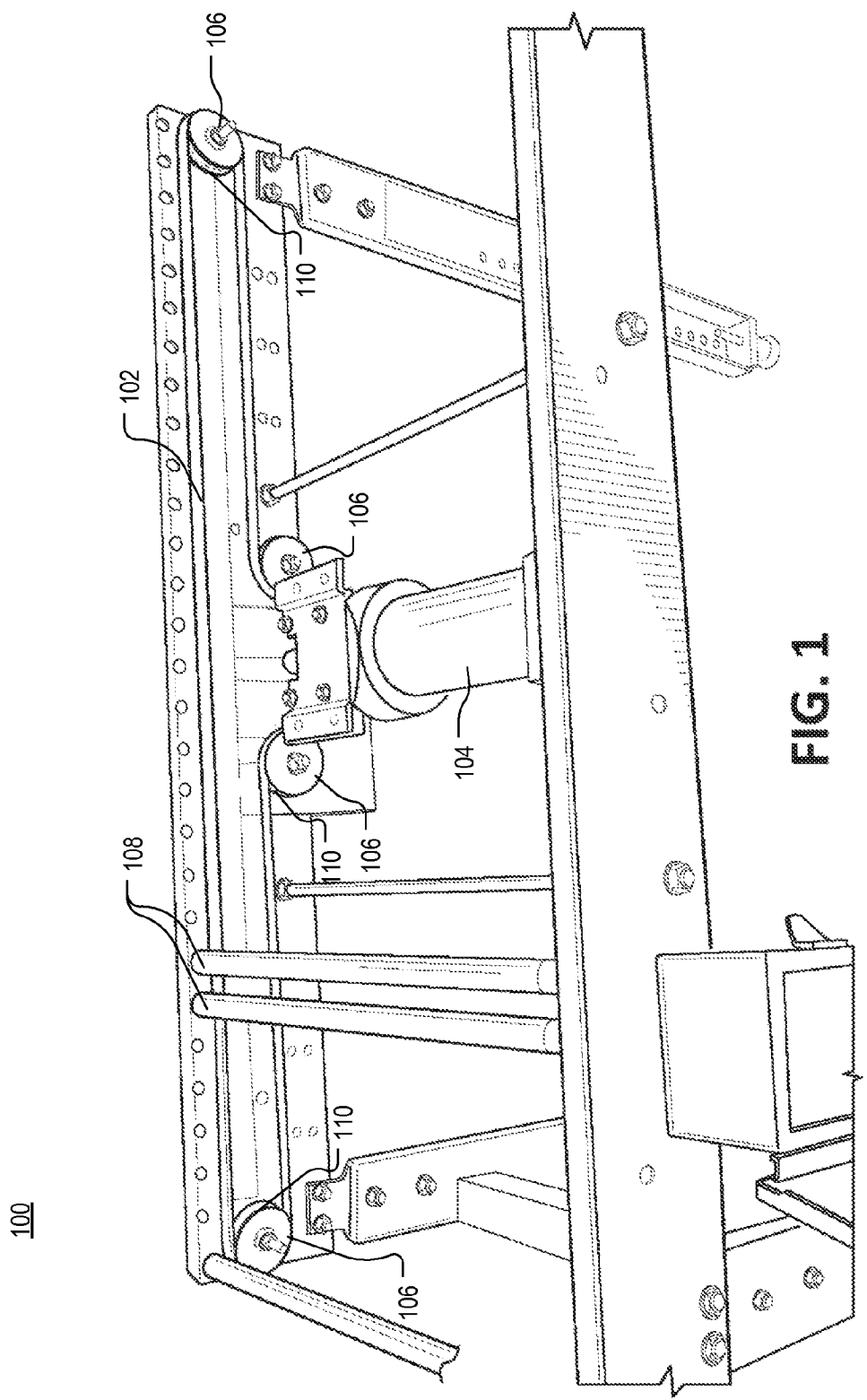

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Aspects of the invention include straight sections of powered roller conveyors, 90 degree sections of powered roller conveyors, and 180 degree sections of powered roller conveyors, as well as powered roller conveyor systems including any such sections, methods of using such powered roller sections and conveyors, and methods of making such powered roller sections and conveyors.

A. Powered Roller Conveyor Systems: Straight Sections

Figure 2:
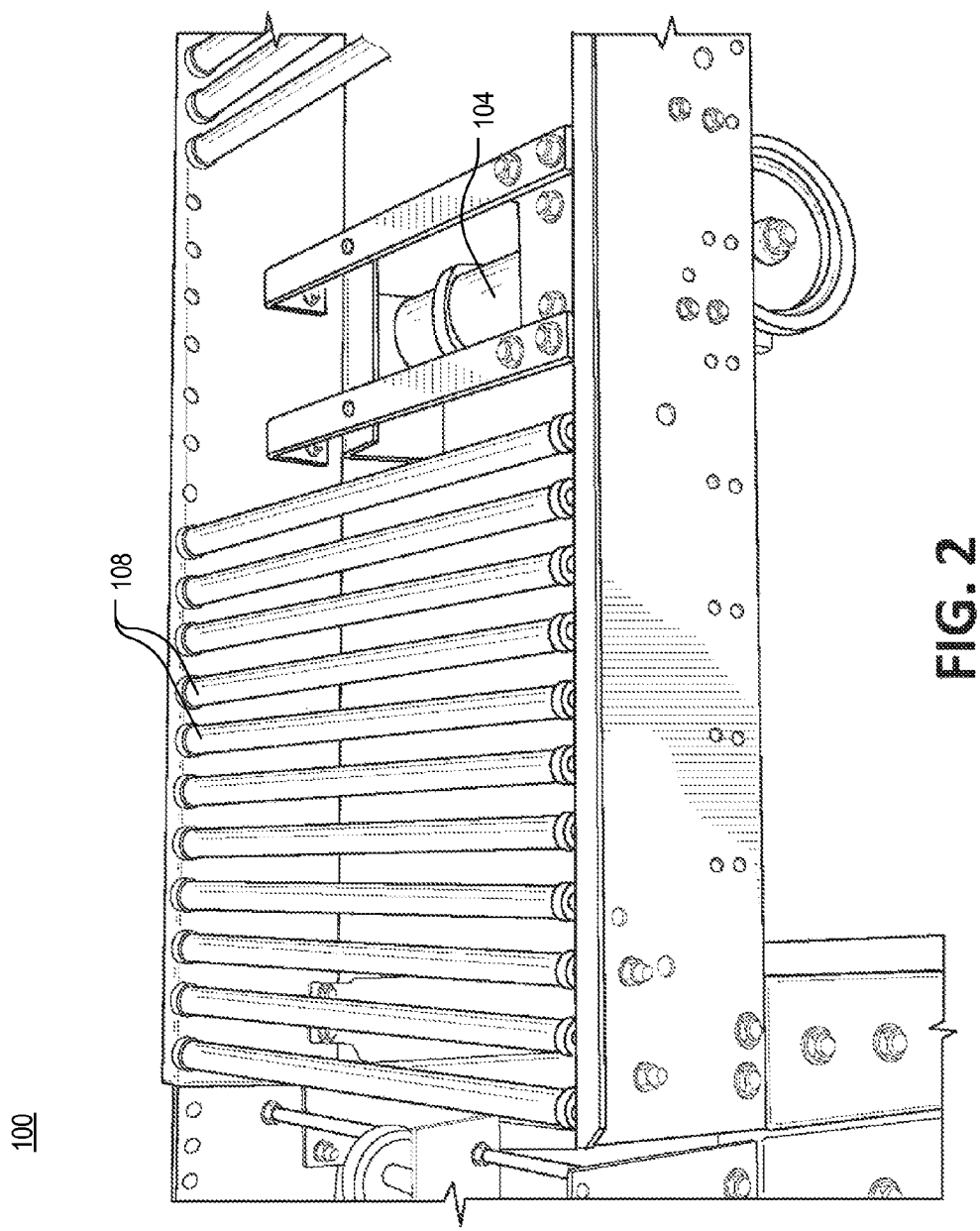
FIG. 2 show a preferred powered roller conveyor system including a straight slide mechanism in accordance with one or more aspects that is partially disassembled.

In accordance with an aspect of the invention, a straight section of a powered roller conveyor uses a straight slide mechanism in conjunction with an endless loop to enable powering of the rollers. FIGS. 1 & 2 illustrate one embodiment of a partially disassembled straight slide mechanism 100. In particular, the loop 102 is driven by an external motor 104, and the loop slides along a surface of the slide mechanism 106. The slide mechanism 106 maintains the loop 102 in frictional engagement with surfaces of rollers 108 of the conveyor, whereby the rollers 108 are directly driven by the loop. The loop 102 that is used preferably is flexible and includes an outermost exterior surface that is smooth, and there preferably exists a low coefficient of friction between the surface of the slide mechanism 106 (against which the loop moves) and the loop 102.

In a feature of this aspect of the invention, the straight slide mechanism 100 includes a material that is self lubricating, whereby frictional stress exerted on the loop by the slide mechanism 106 is greatly reduced. The slide preferably is made from "UHMW-PE" or Ultra High Molecular Weight Polyethylene. The loop 102 is composed of polyurethane or related polymers; however, in certain preferred embodiments the loop 102 comprises a belt formed from tanned leather (indeed, the leather has been found to have a good coefficient of friction and does not stretch as much as polyurethane or related polymers). It furthermore it contemplated that the loop 102 may be composed or formed from rope, rubber and other assorted materials.

In a preferred embodiment, the slide mechanism 106 comprises a block of material having a groove 110 on the upper surface thereof within which the loop moves when engaged by the slide material and pressed into engagement with rollers. A preferred powered roller conveyor system including such a straight slide mechanism 100 in accordance with this aspect is shown partially disassembled in FIG. 1 and drawing 20a-20b of the '002 publication. Another preferred powered roller conveyor system including such a straight slide mechanism 100 in accordance with this aspect is shown partially disassembled in FIG. 2 and drawings 21a-21g of the '002 publication.

In a feature of these preferred embodiments, sides of the slide mechanism that define the groove may be scalloped and include a wavy profile in order to further insure that the loop is kept within the groove during operation and does not jump out of the track. While not shown in FIGS. 1, 2 and drawings 20a-21g of the '002 publication, such feature is shown below in connection with 90 degree curved sections of certain preferred embodiments of the invention.

As will be appreciated, the slide mechanism of a powered roller conveyor in accordance with this aspect of the invention includes fewer parts and has the advantage of simplicity and reduced cost over powered roller conveyors having the foregoing conventional straight sections.

B. Powered Roller Conveyor Systems: 90 Degree Curved Sections

In accordance with an aspect of the invention, a 90 degree curved section of a powered roller conveyor uses a straight slide mechanism to enable powering of the rollers. FIGS. 3, 4, 5, & 6 illustrate one embodiment of a partially disassembled 90 degree curved section of a powered roller conveyor 200. Furthermore, the rollers include regular (long) rollers 212 that extend between the side rails of the conveyor, as well as "concentrated" rollers 214, each of which is disposed to these regular rollers and extends between the outer rail 216 of the conveyor and an intermediate support 218, which extends the length of the conveyor section. The concentrated rollers 214 help bridge the spacing between the regular rollers 212 in the turns of the conveyor system.

As before, the loop 102 powering the rollers slides along a surface of the slide mechanism 106. The slide mechanism 106 maintains the loop in frictional engagement with surfaces of rollers 108, 212, 214, of the conveyor, whereby the rollers 108, 212, 214, are directly driven by the loop 102. The loop 102 that is used preferably is flexible and includes an outermost exterior surface that is smooth, and there preferably exists a low coefficient of friction between the surface of the slide mechanism 106 (against which the loop moves) and the loop 102.

In a feature of this aspect of the invention, the straight slide mechanism includes a material that is self lubricating, whereby frictional stress exerted on the loop by the slide mechanism is greatly reduced. The slide preferably is made from "UHMW-PE" or Ultra High Molecular Weight Polyethylene. The loop is composed of polyurethane or related polymers; however, in certain preferred embodiments the loop comprises a belt formed from tanned leather (indeed, the leather has been found to have a good coefficient of friction and does not stretch as much as polyurethane or related polymers). It furthermore is contemplated that the loop may be composed or formed from rope, rubber and other assorted materials.

In a preferred embodiment, the slide mechanism 106 comprises a block of material having a groove 110 on the upper surface thereof within which the loop moves when engaged by the slide material and pressed into engagement with rollers. In a feature thereof, sides defining the groove are scalloped and include a wavy profile in order to further insure that the loop is kept within the groove during operation.

Figure 3:
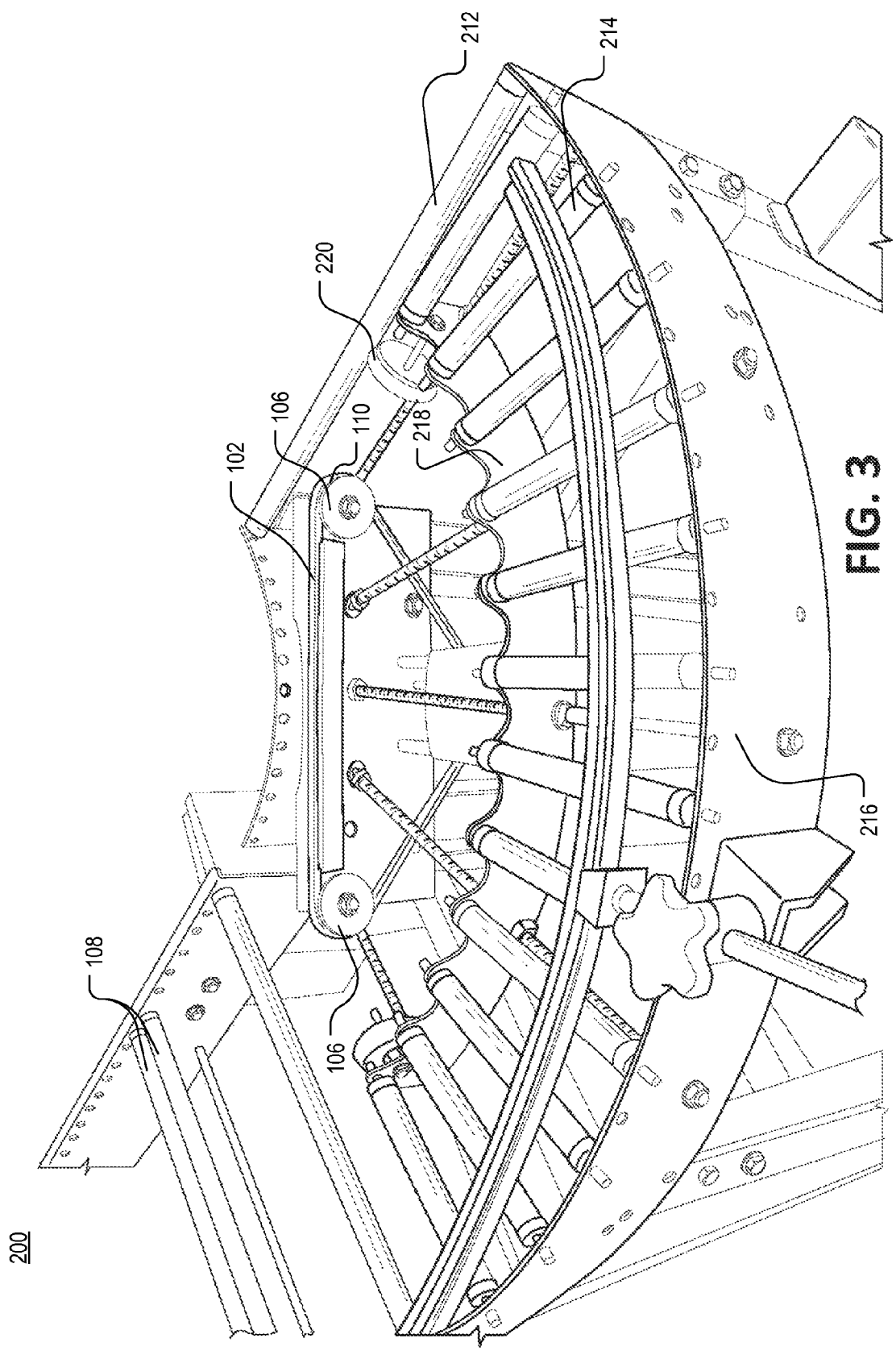
FIGS. 3-5 show a partially disassembled powered roller conveyor system in accordance with a preferred embodiment including a straight slide mechanism.
Figure 4:
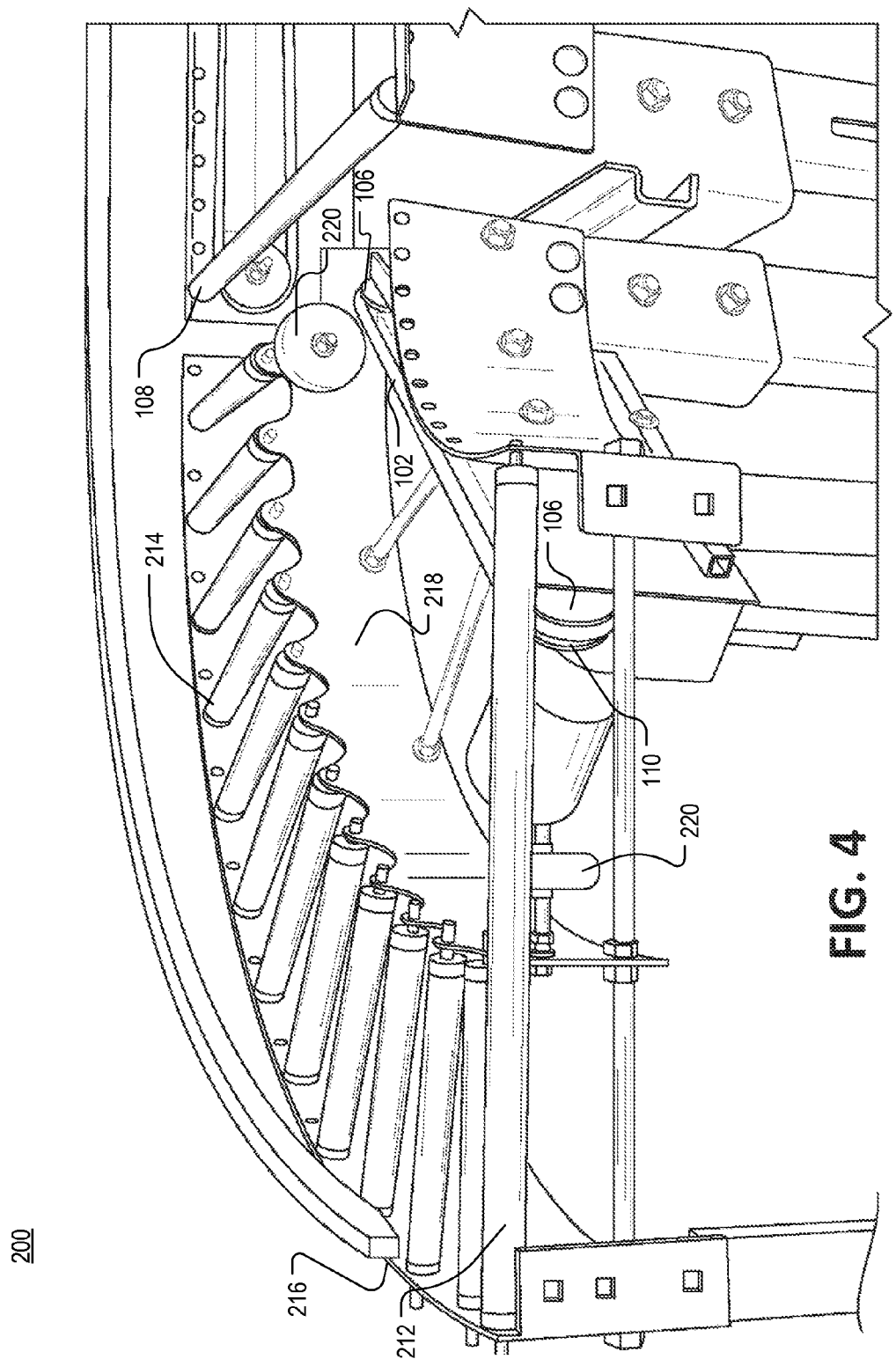
Figure 5:
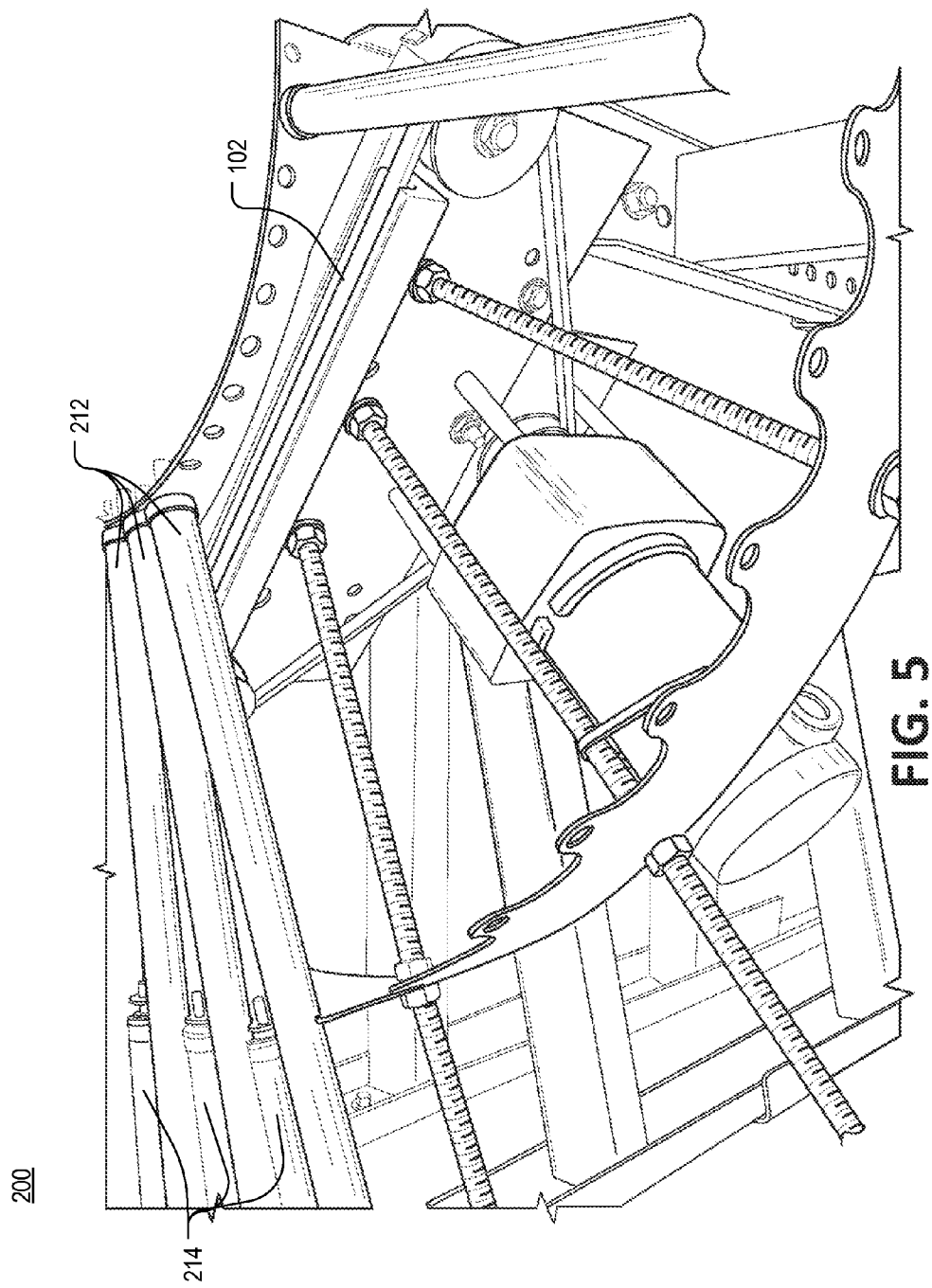
Figure 6:
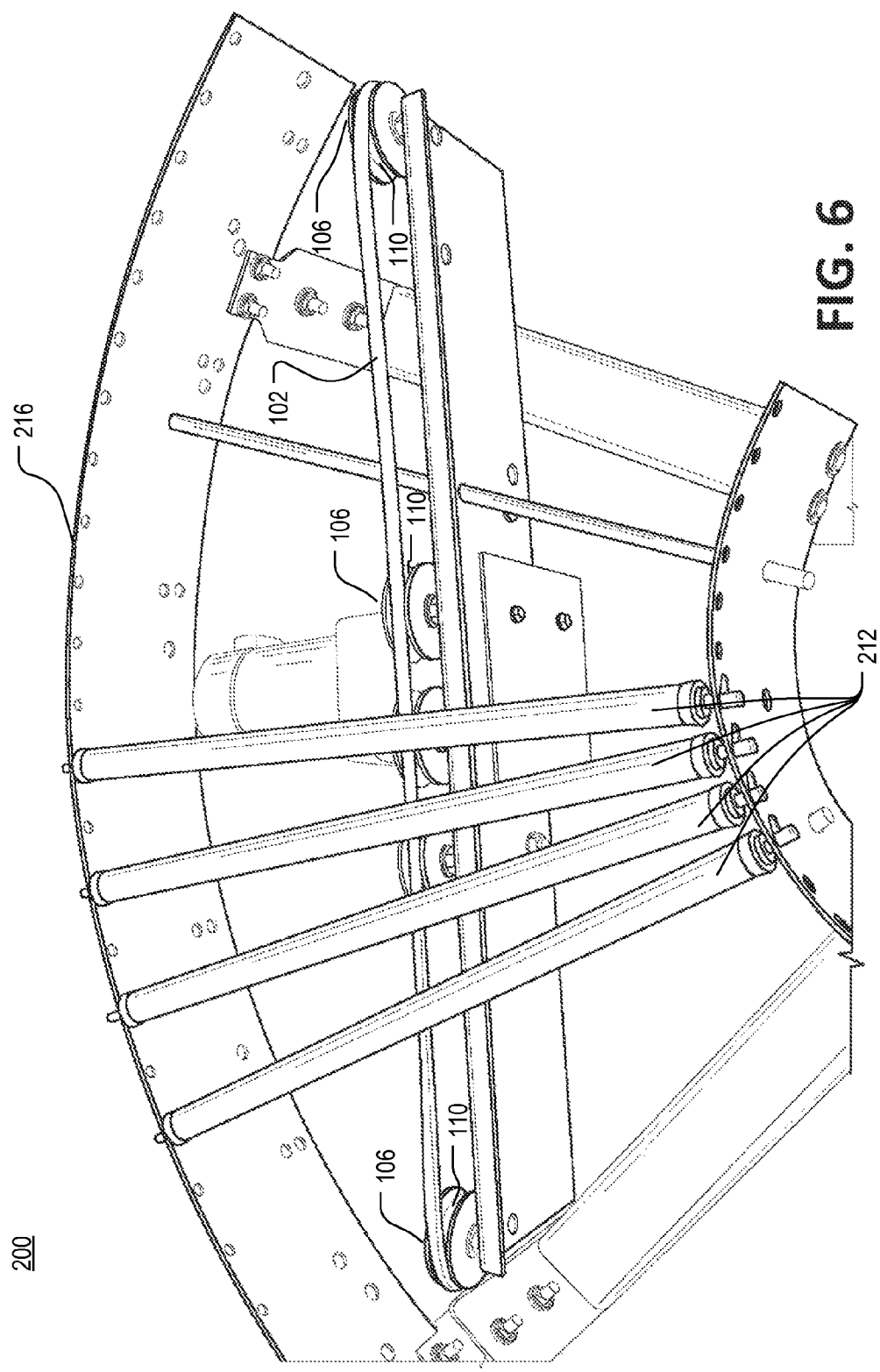
FIG. 6 show a partially disassembled preferred powered roller conveyor system including a straight slide mechanism in accordance with one or more aspects.

A powered roller conveyor system in accordance with a preferred embodiment including such a straight slide mechanism is shown partially disassembled in FIGS. 3, 4, 5 and drawings 22-29 of the '002 publication, and another preferred powered roller conveyor system including such a straight slide mechanism in accordance with this aspect also is shown partially disassembled in FIG. 6 and drawings 30-31 of the '002 publication. Generally, the preferred powered roller conveyor system of FIG. 6 and drawings 30-31 of the '002 publication differs from that of FIGS. 3, 4, 5 and drawings 22-29 of the '002 publication only in the location of the straight slide mechanism, which has been moved away from the short conveyor rail to the middle of the conveyor in FIG. 6 and drawings 30-31 of the '002 publication. It further is contemplated that the straight slide mechanism could be moved to adjacent the longer (outer) conveyor rail opposite the short (inner) conveyor rail.

Additionally, in accordance with another aspect of the invention, a standalone wheel 220 indirectly drives rollers in the curved section of the 90 degree powered roller conveyor system. FIGS. 3 and 4 illustrate one embodiment of a partially disassembled 90 degree curved section of a powered roller conveyor 200 with a standalone wheel 220. In this respect, the rollers that are touched by the motor driven loop are directly driven, whereas the last roller is indirectly driven by means of the wheel, which bridges the last roller with a directly driven roller.

In a feature of this aspect, only a single roller is directly driven, and all of the remaining rollers are indirectly driven by such bridging wheels. Each bridging wheel preferably is coated in silicone for traction with the bridged rollers. In another feature of this aspect, only a single roller is indirectly driven by a bridging wheel, and all other rollers are directly driven. In still yet another feature, a first plurality of rollers are directly driven, and a second plurality of rollers are indirectly driven by bridging wheels. In this respect, each bridging wheel may connect rollers that are separated by a single roller; however, it is also contemplated within the scope of the invention that a wheel may engage and drive an immediately adjacent roller if not directly driven.

Accordingly, in this aspect of the invention, use of the wheel enables, inter alia, both the ability to drive the last roller without a loop of material and without the directly driven roller and the last roller including the crimp for accommodating the loop. As such, the rollers of the same length are capable of being interchanged and are not configured to be location specific within the conveyor section.

The wheel is included in the powered roller conveyor system of FIGS. 3, 4, and drawings 22-29 of the '002 publication and, in particular, can be seen in drawings 26-29 of the '002 publication.

In alternative embodiments of powered roller conveyor systems that include 90 degree curved sections, the straight slide mechanism preferably is replaced with a curved slide mechanism. In this respect, the curved slide mechanism is generally the same as the straight slide mechanism but, instead of being straight, includes a curve that generally matches a curve of the 90 degree curved section. The curved slide mechanism includes a curve that generally matches either the curve of the inner side wall of the 90 degree curved section or the outer side wall of the 90 degree curved section. Like the straight slide mechanism, the straight slide mechanism includes a material that is self lubricating, whereby frictional stress exerted on the loop by the slide mechanism is greatly reduced.

Figure 7:
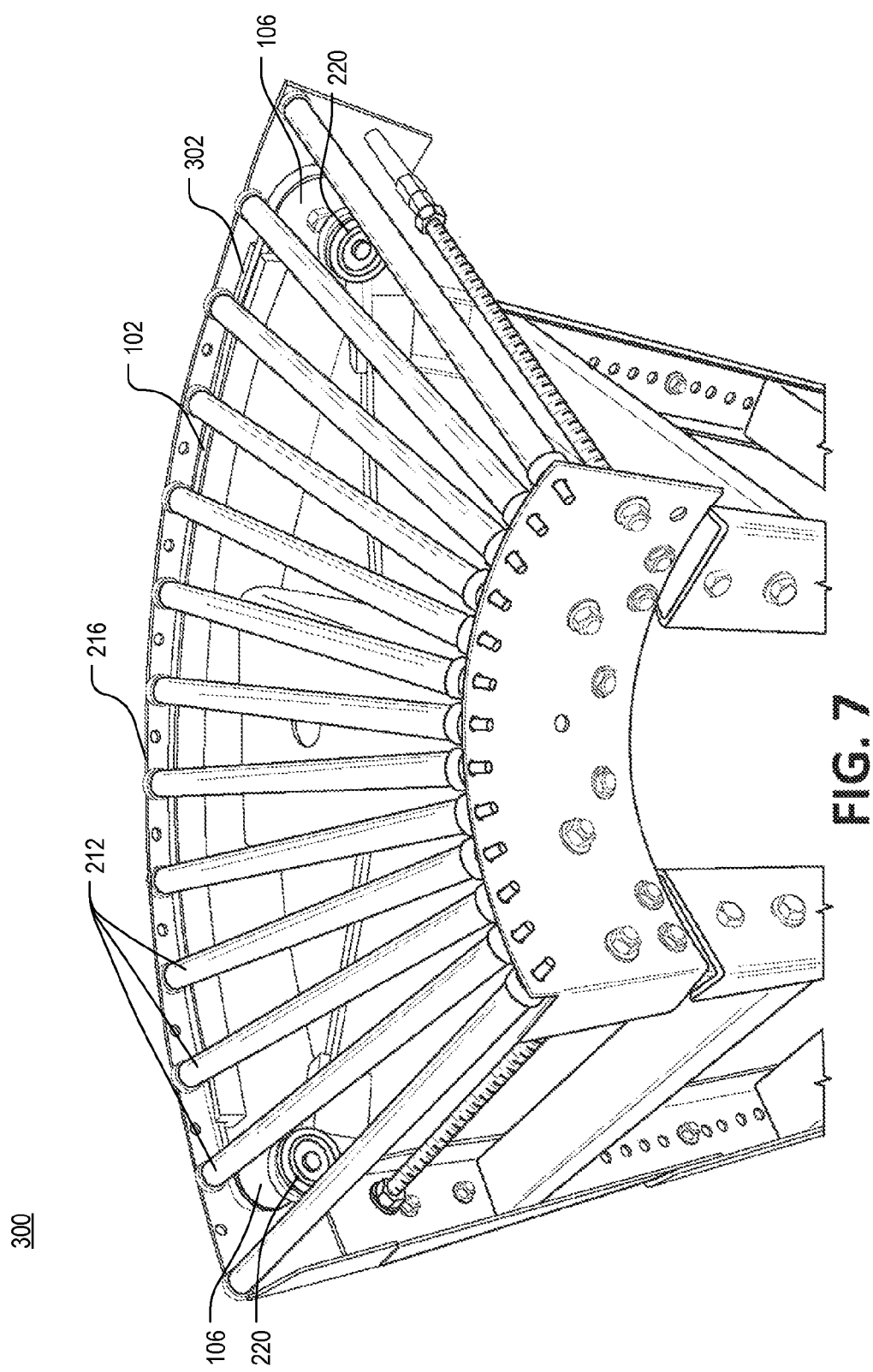
FIGS. 7-9 show powered roller conveyor systems in accordance with preferred embodiments that include curved slide mechanisms.
Figure 8:
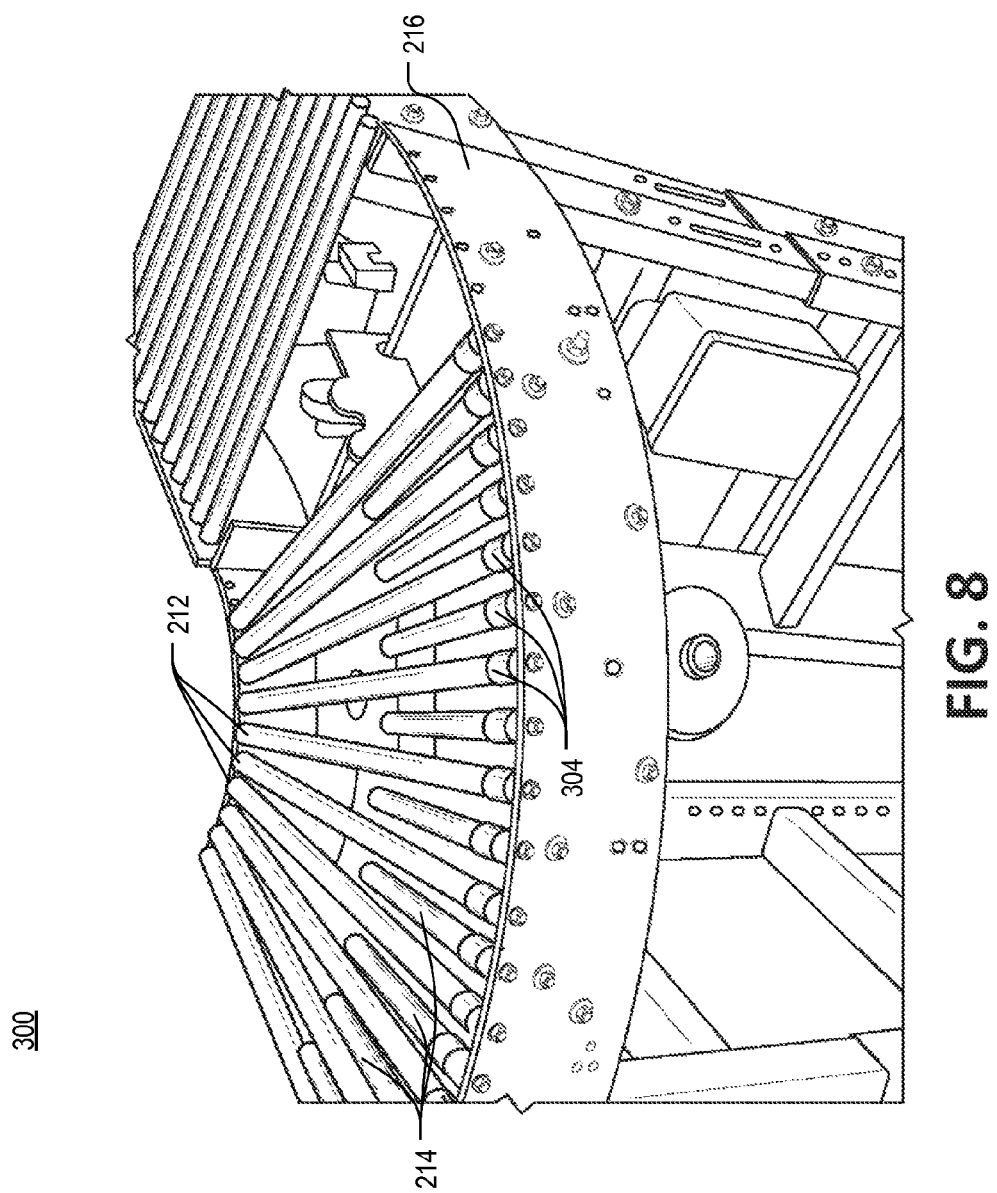
Figure 9:
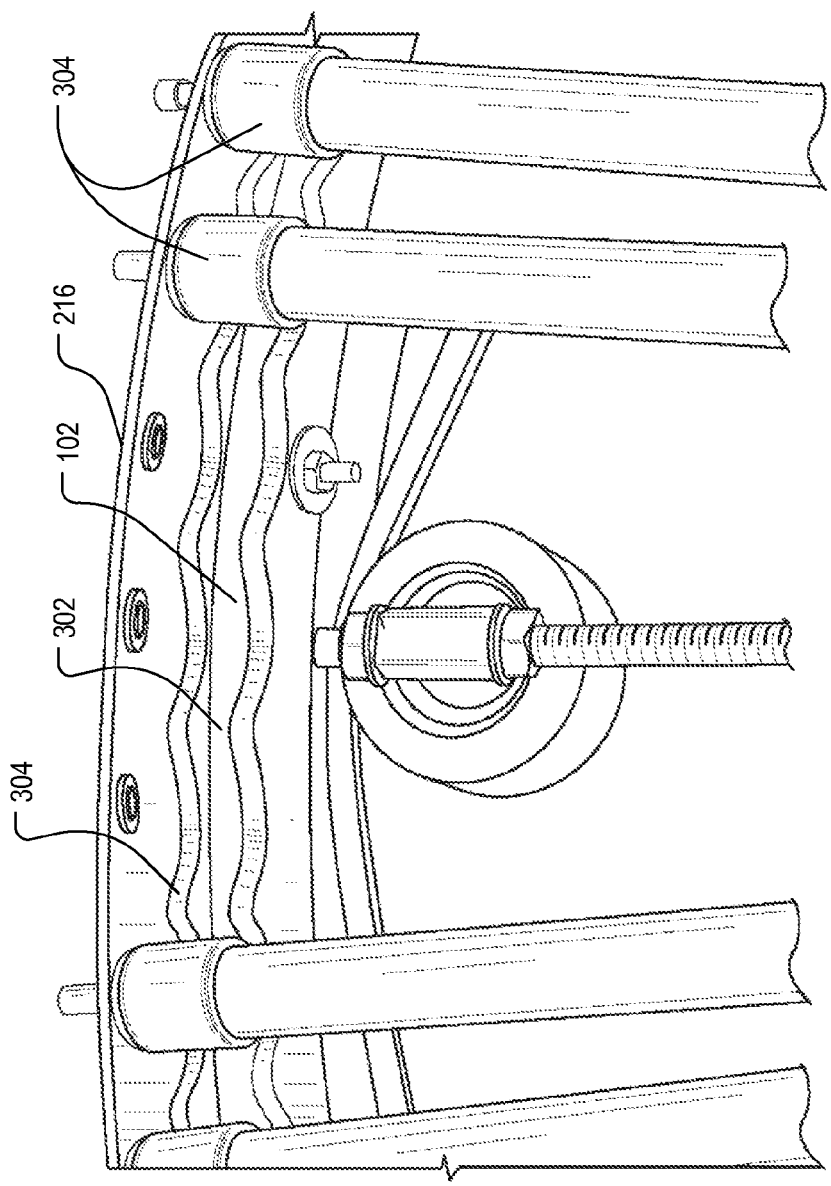

Additional powered roller conveyor systems in accordance with preferred embodiments of the invention that include curved slide mechanisms 300 are shown in FIG. 7 and drawings 32a-32d of the '002 publication and FIGS. 8, 9 and drawings 33a-33j of the '002 publication. The curved slide mechanism 302 in each is located adjacent the longer (outer) conveyor rail 216. This curved slide mechanism 302 additionally includes the scalloped sides 304 defining the groove within which the loop 102 is received and travels. Furthermore, the loop 102 in the embodiment of FIG. 7 and drawings 32a-32d of the '002 publication is comprised of polyurethane. In contrast, the loop 102 in the embodiment of FIGS. 8, 9 and drawings 33a-33j of the '002 publication comprises a leather belt. The leather belt preferably includes a flat, smooth exposed surface for contacting each sleeve of the roller, and a curved non-exposed surface that conforms to the shape of the groove.

In any of these embodiments, the slide mechanism 106 maintains the loop 102 in frictional engagement with an underside surface of the rollers 212, 214, whereby the rollers 212, 214, are driven by the loop 102. The loop material and roller surfaces further include nonslip characteristics such that undue slipping does not occur between the loop and driven rollers when the loop is driven by the motor. Moreover, the rollers in the embodiment of FIGS. 8, 9 and drawings 33a-33j of the '002 publication include rubber end sleeves 304 that slip over the ends of the rollers and are arranged to engage the loop in frictional contact therewith. These sleeves are used to adjust the desired slip and/or grip with the loop for driving the rollers. Sleeves 304 having different coefficients of friction with the loop 102 may be selected and used from time to time to accomplish such adjustment. This is particularly advantageous when articles to be moved at different times along the conveyor have substantially different weights. Further in this respect, each roller 212, 214, is capable of being quickly removed from the conveyor for changing of the sleeve. The ease of removal of each roller from the side rails of the conveyor is demonstrated in drawings 34a-34c of the '002 publication.

As in the embodiment of FIGS. 3, 4, and drawings 22-29 of the '002 publication, the embodiments of FIG. 7 and drawing 32a-32d of the '002 publication and FIGS. 8, 9 and drawing 33a-33j of the '002 publication include use of the bridging wheels 220 for indirectly driving end rollers, as shown for example in FIG. 7 and in drawings 32a and 33e of the '002 publication.

C. Powered Roller Conveyor Systems: 180 Degree Curved Sections

In another aspect of the invention, a powered roller conveyor system includes a 180 degree curved section having a curved slide mechanism used to power the rollers in the 180 degree curved section. As before, the loop slides within a groove or track defined in the top surface of the slide mechanism. The slide mechanism maintains the loop in frictional engagement with surfaces of rollers of the conveyor, whereby the rollers are directly driven by the loop. The loop that is used preferably is flexible and includes an outermost exterior surface that is smooth, and there preferably exists a low coefficient of friction between the surface of the slide mechanism (against which the loop moves) and the loop.

In a feature of this aspect of the invention, the curved slide mechanism includes a material that is self lubricating, whereby frictional stress exerted on the loop by the curved slide mechanism is greatly reduced. The slide preferably is made from "UHMW-PE" or Ultra High Molecular Weight Polyethylene. The loop is composed of polyurethane or related polymers; however, in certain preferred embodiments the loop comprises a belt formed from tanned leather (indeed, the leather has been found to have a good coefficient of friction and does not stretch as much as polyurethane or related polymers). It furthermore is contemplated that the loop may be composed or formed from rope, rubber and other assorted materials.

In a preferred embodiment, the slide mechanism comprises a block of material having a groove on the upper surface thereof within which the loop moves when engaged by the slide material and pressed into engagement with rollers. In a feature thereof, sides defining the groove are scalloped and include a wavy profile in order to further insure that the loop is kept within the groove during operation.

In accordance with an aspect of the invention, a standalone wheel (sometimes referred to herein as a bridging wheel) indirectly drives rollers in the curved section of the 180 degree powered roller conveyor system. In this respect, the rollers that are touched by the motor driven loop are directly driven, whereas the last roller is indirectly driven by means of the wheel, which bridges the last roller with a directly driven roller.

In a feature of this aspect, only a single roller is directly driven, and all of the remaining rollers are indirectly driven by such bridging wheels. In another feature of this aspect, only a single roller is indirectly driven by a bridging wheel, and all other rollers are directly driven. In still yet another feature, a first plurality of rollers are directly driven, and a second plurality of rollers are indirectly driven by bridging wheels. In this respect, each bridging wheel may connect rollers that are separated by a single roller; however, it is also contemplated within the scope of the invention that a wheel may engage and drive an immediately adjacent roller if not directly driven A preferred 180 degree curved section of a powered roller conveyor system including such a curved slide mechanism in accordance with this aspect of the invention is shown partially disassembled in drawings 35a-35c of the '002 publication. While this embodiment is shown as a single frame that curves 180 degrees, in alternative embodiments, two 90 degree curved sections may be joined end-to-end to form a 180 degree curved section of a powered roller conveyor system.

A first commercial powered conveyor apparatus incorporating aspects and features of the present invention is shown in drawings 36a-36g of the '002 publication, as well as in drawings 37a-37b of the '002 publication, which represent close-up views of drawings 36a of the '002 publication that better illustrate the bridging wheels of the commercial powered conveyor apparatus. This particular powered conveyor apparatus includes an exterior or "outside" integrated guide rail that is higher than normal. This guide rail extends above the rollers and keeps packages being conveyed from falling off the conveyor as they traverse the curve or when the downstream conveyor gets full and backs everything up onto the 180 powered conveyor apparatus shown.

It will be appreciated that, in any of the foregoing power conveyor systems, individual motors (one mounted to each section) may respectively power each section or, alternatively, a single motor may be utilized to power multiple sections jointed together.

As will be appreciated, the curved slide mechanism of a powered roller conveyor in accordance with this aspect of the invention includes fewer parts and has the advantage of simplicity and reduced cost over conventional powered roller conveyor systems having 180 degree curved sections.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A section of a power roller conveyor, comprising:
   (a) a plurality of rollers;
   (b) an endless loop driven either directly or indirectly by a motor and traveling along the section and in engagement with at least a subset of the plurality of rollers;
   (c) a slide mechanism defining a groove within which the endless loop slides while traveling in engagement with the subset of rollers; and
   (d) a wheel arranged to engage a roller of the subset of rollers driven by the loop and to engage a roller not in engagement with the loop, whereby the roller not in engagement with the loop is indirectly driven by the loop.

2. The section of a power roller conveyor according to claim 1, wherein the groove is defined in the top surface of the slide mechanism.

3. The section of a power roller conveyor according to claim 1, wherein the loop is maintained in frictional engagement with surfaces of the rollers of the subset, whereby the rollers are directly driven by the loop.

4. The section of a power roller conveyor according to claim 1, wherein each of the subset of rollers includes a sleeve extending over the surface thereof adjacent an end thereof, the sleeve engaging the loop for traction and driving of the roller.

5. The section of a power roller conveyor according to claim 4, wherein a high coefficient of friction exists between the surface of the loop and the sleeve of the roller relative to a low coefficient of friction that exists between the surface of the slide mechanism against which the loop slides and the loop.

6. The section of a power roller conveyor according to claim 1, wherein the slide mechanism comprises a curved slide mechanism that generally tracks a curve in a side rail of the section of the powered conveyor system.

7. The section of a power roller conveyor according to claim 1, wherein the slide mechanism comprises a straight slide mechanism that generally extends linearly along a length of the section of the powered conveyor system.

8. The section of a power roller conveyor according to claim 1, wherein sides of the slide mechanism that at least partially define the groove are scalloped, and wherein the subset of rollers extend within the recessed areas of the scalloped sides for contacting of the loop.

9. The section of a power roller conveyor according to claim 1, wherein the sides of the slide mechanism exhibit a wavy profile, and wherein the subset of rollers extend within the troughs of the wavy sides to contact the loop.

10. The section of a power roller conveyor according to claim 1, wherein the loop includes a flat, smooth surface that is exposed when traveling in engagement with the subset of rollers, and a non-exposed curved surface that slides against the slide mechanism in a conforming fit within the groove.

11. The section of a power roller conveyor according to claim 1, wherein the section is a straight section, a 90 degree section, or a 180 degree section.

12. The section of a power roller conveyor according to claim 11, wherein the slide mechanism is curved or is generally linear.

13. The section of a power roller conveyor according to claim 1, wherein the roller not in engagement with the loop that is indirectly driven by the loop is an end roller of the section.

14. The section of a power roller conveyor according to claim 13, further comprising a second wheel arranged to engage a roller of the subset of rollers driven by the loop and to engage a second roller not in engagement with the loop, whereby the second roller not in engagement with the loop is indirectly driven by the loop, and wherein the second roller not in engagement with the loop that is indirectly driven by the loop is another end roller of the section located at an opposite end of the section to the first said roller not in engagement with the loop that is indirectly driven by the loop.

15. The section of a power roller conveyor according to claim 13, wherein an intermediate, concentrated roller extends between the roller of the subset engaged with the wheel and the end roller driven by the wheel.

16. The section of a power roller conveyor according to claim 13, wherein the concentrated roller is approximately half as long as each of the roller of the subset engaged with the wheel and the end roller driven by the wheel.

17. The section of a power roller conveyor according to claim 15, wherein the concentrated roller is mounted to a side rail of the conveyor and is a member of the subset of rollers arranged in engagement with and driven by the loop.

18. The section of a power roller conveyor according to claim 17, wherein the concentrated roller is mounted to a side rail of the conveyor and is a member of the subset of rollers arranged in engagement with and driven by the loop.

19. The section of a power roller conveyor according to claim 17, wherein the concentrated roller is mounted to and supported by an intermediate support that extends generally longitudinally along the section approximately half way between the side rails of the section.

* * * * *